United States Patent
Cai et al.

(10) Patent No.: US 9,161,187 B2
(45) Date of Patent: Oct. 13, 2015

(54) CALLER ID FOR TEXT MESSAGING

(75) Inventors: Yigang Cai, Naperville, IL (US); Shaumir Shah, Aurora, IL (US)

(73) Assignee: Alcatel Lucent, Boulogne-Billancourt (FR)

(*) Notice: Subject to any disclaimer, the term of this patent is extended or adjusted under 35 U.S.C. 154(b) by 84 days.

(21) Appl. No.: 13/476,678

(22) Filed: May 21, 2012

(65) Prior Publication Data

US 2013/0310013 A1 Nov. 21, 2013

(51) Int. Cl.
*H04M 3/42* (2006.01)
*H04W 4/14* (2009.01)
*H04W 4/16* (2009.01)

(52) U.S. Cl.
CPC . *H04W 4/14* (2013.01); *H04W 4/16* (2013.01)

(58) Field of Classification Search
USPC .......................................................... 455/415
See application file for complete search history.

(56) References Cited

U.S. PATENT DOCUMENTS

| 7,636,578 | B1* | 12/2009 | Cope et al. | 455/466 |
|---|---|---|---|---|
| 8,959,097 | B2* | 2/2015 | Danis et al. | 707/756 |
| 2006/0242245 | A1* | 10/2006 | Christensen | 709/206 |
| 2008/0016158 | A1* | 1/2008 | Bin | 709/206 |
| 2008/0123686 | A1* | 5/2008 | Lee et al. | 370/466 |
| 2009/0316868 | A1* | 12/2009 | Mariniello | 379/142.04 |
| 2010/0216440 | A1* | 8/2010 | Heikkila et al. | 455/415 |
| 2011/0294479 | A1* | 12/2011 | Kumar et al. | 455/415 |
| 2012/0021730 | A1* | 1/2012 | Vendrow | 455/415 |
| 2013/0035121 | A1* | 2/2013 | Russell | 455/466 |

OTHER PUBLICATIONS

3rd Generation Partnership Project; Technical Specification Group Terminals; Technical realization of the Short Message Service (SMS); (Release 4) 3GPP TS 23.040 V4.1.0 (Oct. 2000) 650 Route des Lucioles—Sophia Antipolis Valbonne—France.

* cited by examiner

*Primary Examiner* — Mazda Sabouri
(74) *Attorney, Agent, or Firm* — Duft Bornsen & Fettig, LLP

(57) ABSTRACT

Systems and methods for providing caller ID information for text messaging. In one embodiment, a message center receives a text message from a sender, and identifies a name of the sender. The message center then inserts the sender name in the text message, and transmits the text message towards a recipient.

14 Claims, 6 Drawing Sheets

CALLER ID FOR TEXT MESSAGING

FIELD OF THE INVENTION

The invention is related to the field of communications and, in particular, to text messaging.

BACKGROUND

Telecommunication networks provide many types of communications to its end user. The traditional mode of communication is a voice call. When a caller places a call to a called party, a switch in the network receives a call request (e.g., DTMF) from the caller's phone. The switch then routes the call request through the network until the call reaches the terminal of the called party.

Another type of communication is text messaging. Text messaging has become as popular or more popular than voice calls in many mobile (or wireless) networks. One example of text messaging is Short Message Service (SMS), which is a set of communication protocols allowing the exchange of short text messages (i.e., 160 characters or less) between devices. While the term "text message" traditionally referred to text-only messages sent using SMS, it has been extended to include multimedia messages, such as images, video, sound content, etc. The multimedia messages may be sent using Multimedia Message Service (MMS) protocol.

To send an SMS message, for example, the sender enters text into his/her end user device, and the device encodes the text into an SMS message. The end user device then sends the SMS message to a serving element in the network (e.g., a Mobile Switching Center (MSC)) through the appropriate signaling protocol. The serving element then forwards the SMS message to an SMS Center (SMSC) where the message is stored and queued for delivery to its intended recipient.

Regardless of the mode of communication chosen by an end user, service providers offer many services. One service provided for voice calls is caller identification (caller ID). A caller ID service transmits the caller's number and the caller's name (if available) to the called party's terminal while the call is being set up but before the call is answered (i.e., during the ringing signal for the call). Thus, the called party is able to see who is calling before answering the call. These and other services generate revenue for the service providers, so they are continually trying to find new services to offer to their customers.

SUMMARY

Embodiments described herein provide caller ID services for text messages. When a text message is sent, a message center is able to identify a name for the sender, and to send information on the name of the sender to the recipient along with the text message. The end user device of the recipient is then able to display the name of the sender to the recipient. Therefore, even if the recipient receives a text message from someone who is not in their contact list, the name of the sender will be displayed to the recipient.

One embodiment comprises a message center configured to receive a text message from a sender, and to identify a name of the sender. The message center is further configured to insert the sender name in the text message, and to transmit the text message towards a recipient.

In another embodiment, the message center is further configured to insert the sender name in a header of the text message, such as in a new parameter of the header of the text message.

In another embodiment, the message center is further configured to insert the sender name into a payload of the text message.

In another embodiment, the message center is further configured to process policy rules to determine whether to insert the sender name in the text message, such as to process an identity of the recipient to determine whether to insert the sender name in the text message.

In another embodiment, the message center is further configured to identify a plurality of names defined for the sender, and to select one of the names based on policy rules.

Another embodiment comprises an end user device that is configured to receive a text message, and to identify a sender name inserted in the text message. The end user device is further configured to determine if the sender name corresponds with a contact name stored in a contact list. If the sender name corresponds with a contact name stored in the contact list, then the end user device is further configured to determine whether to display the sender name from the text message or the contact name from the contact list.

In another embodiment, the end user device is further operable to determine that the sender name from the text message has precedence over the contact name from the contact list, and to display the sender name from the text message to the recipient.

In another embodiment, if the sender name does not correspond with a contact name, then the end user device is further configured to display the sender name from the text message to the recipient.

In another embodiment, the end user device is further configured to provide an audible notification indicating the determined name.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
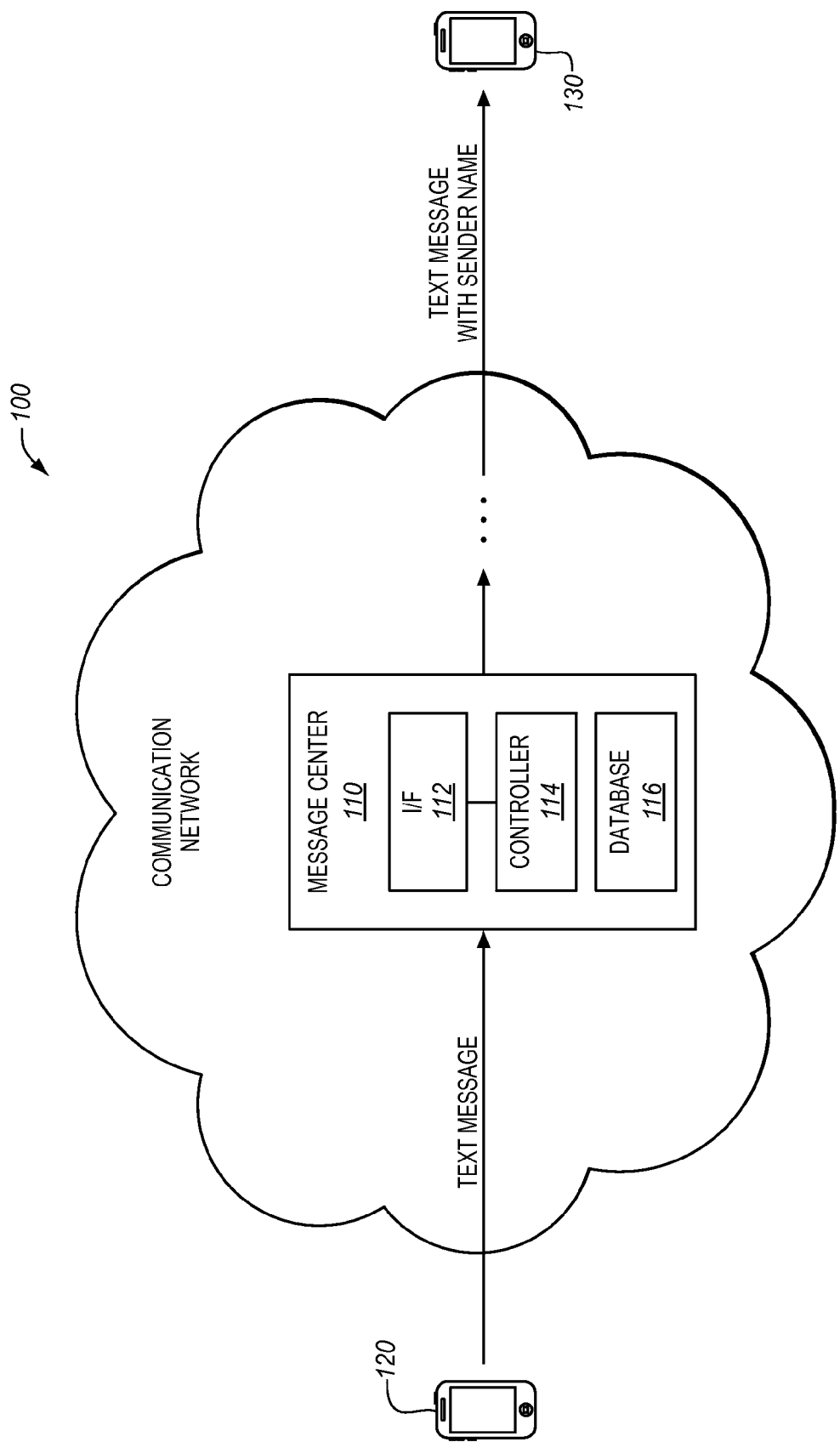
FIG. 1 illustrates a communication network in an exemplary embodiment.

FIG. 1 illustrates a communication network 100 in an exemplary embodiment. Communication network 100 comprises any network that provides communication services to end user devices. Network 100 may comprise a Global System for Mobile Communications (GSM) network, a Universal Mobile Telecommunications System (UMTS) network, a CDMA2000 network, a Long Term Evolution (LTE) network, an IP Multimedia Subsystem (IMS) network, etc. In this embodiment, network 100 provides a text messaging service to its end users. To implement the text messaging service, network 100 includes a message center 110. Message center 110 comprises any node or network element that handles delivery of text messages. Message center 110 may include First Delivery Attempt (FDA) functionality and/or store-and-forward (SNF) functionality to attempt delivery of text messages to their destinations. Some examples of message center 110 include a SMS Center (SMSC), an MMS Center (MMSC), an IP-SM-GW, an SM-IC-GW, an LTE-SM-GW, etc.

In this embodiment, message center 110 includes an interface 112 and a controller 114. Interface 112 comprises any device, component, or system that is able to send and receive text messages according to a signaling protocol. For example, the signaling protocol may comprise Mobile Application Part (MAP) protocol, Session Initiation Protocol (SIP), Short Message Peer-to-Peer (SMPP) protocol, etc. Controller 114 comprises any device, component or system that controls the operation of message center 110 to insert caller ID information into text messages.

Message center 110 may optionally include a database 116. Database 116 comprises any storage system that is able to store names for end users that send text messages. For instance, database 116 may store one or more names that are mapped to a directory number, a Public User ID (PUID), or some other identifier for a sender. Based on the information stored in database 116, controller 114 is able to identify a name for a sender based on some identification that is included in a received text message, such as a directory number.

Network 100 provides a text messaging service to an end user device 120 and other devices not shown in FIG. 1. End user device 120 may comprise a mobile phone, a computer, a tablet PC, etc. Device 120 executes a texting application that receives input from an end user (not shown) for a text message. The application then encodes the input into a text message based on a signaling protocol used by network 100. For example, the application may generate a Protocol Description Unit (PDU) that includes a header and a payload. The header includes metadata for transporting the text message, such as an originating address for the text message, a destination address for the text message, etc. The payload includes the actual content for the text message that was input by the end user. The format of the PDU may depend on the signaling protocol used within network 100.

Assume for this embodiment that an end user of device 120 wants to send a text message to an end user of device 130. When this occurs, device 120 generates the text message as described above based on input from the end user, and sends the text message to message center 110. Message center 110 is considered the "home" message center for device 120. Message center 110 is enhanced in this embodiment to insert caller ID information in the text message before sending the text message to its recipient, which is further illustrated in FIG. 2.

Figure 2:
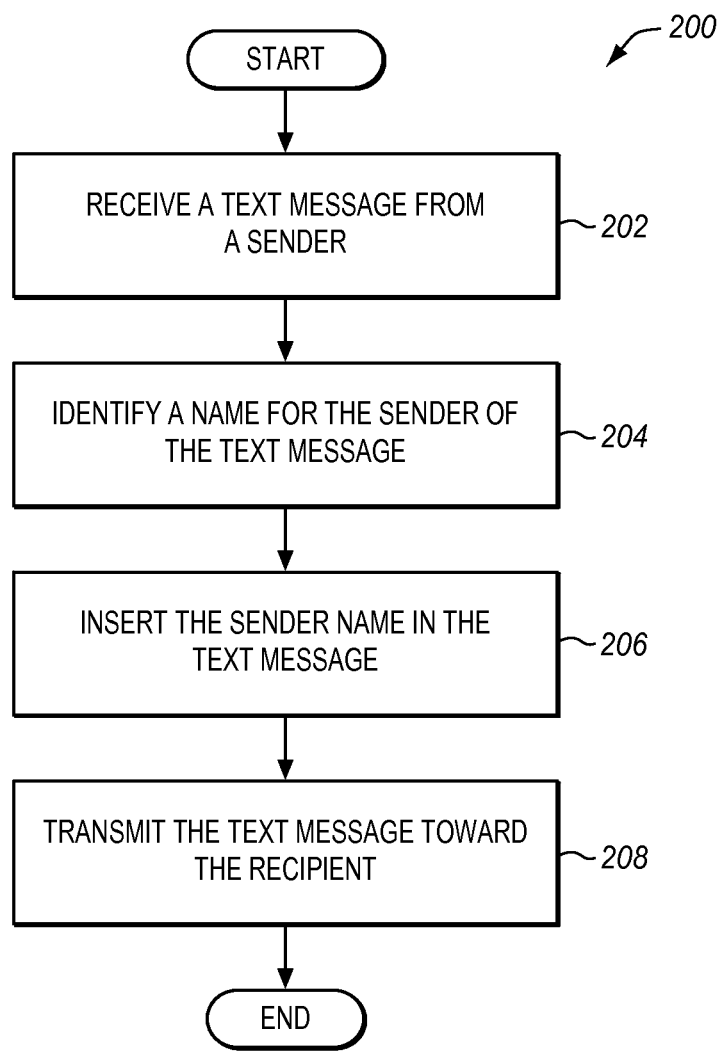
FIG. 2 is a flow chart illustrating a method of inserting caller ID information in a text message in an exemplary embodiment.

FIG. 2 is a flow chart illustrating a method 200 of inserting caller ID information in a text message in an exemplary embodiment. The steps of method 200 will be described with reference to message center 110 in FIG. 1, but those skilled in the art will appreciate that methods described herein may be performed in other systems. The steps of the flow charts described herein are not all inclusive and may include other steps not shown. The steps may also be performed in an alternative order.

In step 202, interface 112 receives the text message from the sender (i.e., from device 120). Because this text message originated in device 120, the text message at this point may be considered a Mobile Originated (MO) text message. Those skilled in the art understand that text messages may also originate from some type of automated system, such as an External Short Messaging Entity (ESME). In those instances, the text message would be considered an Application Originated (AO) text message.

In step 204, controller 114 identifies a name for the sender of the text message. To do so, controller 114 may parse the header or payload of the text message to locate identification information for the sender. For example, the header of a text message typically includes a parameter for the originating address of the text message, such as a MAP SMS_OriginatingAddress parameter. This parameter of a text message may include the directory number of the sender or some other information that uniquely identifies the sender. Controller 114 may then query database 116 using the originating address, or may query an external database, such as a Home Location Register (HLR) or a Home Subscriber Server (HSS), using the originating address, to acquire a name that is associated with the originating address in network 100.

There may be instances where a sender has multiple names defined within network 100. When this occurs, controller 114 may select which name is appropriate for this text message based on policy rules. For example, controller 114 may parse the text message to identify a terminating address of the intended recipient of the text message, and select the name of the sender based on an identity (i.e., address) of the recipient. Controller 114 may select the name of the sender based on the type of text message that is sent, such as SMS, MMS, etc. Controller 114 may process other data along with the policy rules to select which name to use for the sender.

In step 206, controller 114 inserts the sender name in the text message. Controller 114 may insert the sender name in the header of the text message or in the payload of the text message. For example, controller 114 may insert the sender name in an existing parameter of the header of the text message, such as in a sub-address parameter. SMPP protocol, for instance, includes an originating sub-address parameter that uses ASCII coding and no digit limit. Controller 114 may insert the sender name in this existing parameter. In another example, MAP protocol for SMS defines a TP-Originating-Address (TP-OA) parameter. The length of the TP-OA parameter may be expanded so that controller 114 may insert the sender name in this parameter.

In another embodiment, a new parameter may be defined in the protocol used in network 100. The new parameter may be considered on extension of the protocol that is able to carry the sender name. The new parameter may be labeled "caller-name", "sender-name", or something similar. If added to text messaging protocols, the new parameter should include at least coding type, length, and value sub-fields. Controller 114 may then insert the sender name into the new parameter of the protocol.

In step 208, interface 112 transmits the text message toward the recipient, which is end user device 130 in this embodiment. Device 130 may not be served by message center 110. Therefore, interface 112 may send the text message to another message center (not shown) that serves device 130, to a gateway for another network, or to some other entity that will deliver the text message to device 130.

Before inserting the sender name into the text message in step 206 of FIG. 2, message center 110 may process policy rules to determine whether the sender name is authorized to be inserted. For example, the subscribers (i.e., end users) or the network operator may provision rules that define whether or not to populate a text message with a sender name based on conditions, such as:

- Originating mobile air modes, such as TDMA, CDMA, GSM, etc.
- Originating users and user types, such as mobile or application.
- Originating SMS coding types/languages.
- Terminating user address, such as the directory number of the recipient.
- Terminating SMS protocols, such as SMDPP, MAP, SMPP, SIP, Parlay X, RESTful, etc.
- Terminating SMS coding types/languages.
- Number portability rules.
- Others.

Controller 114 may then processes these policy rules to determine whether or not to insert the sender name into the text message. If the determination is to insert the sender name, then controller 114 sends the text message toward the destination with the sender name. If the determination is not to insert the sender name, then controller 114 sends the text message toward the destination without a sender name.

There may be instances where the text message already includes a sender name. For example, an Application Originated (AO) text message may have the sender name already inserted, such as "Bank of America". If a sender name already exists in a MO or AO text message, then controller 114 may decide not to replace the sender name in the text message, and forward the text message with the sender name that was inserted by the originating device.

Figure 3:
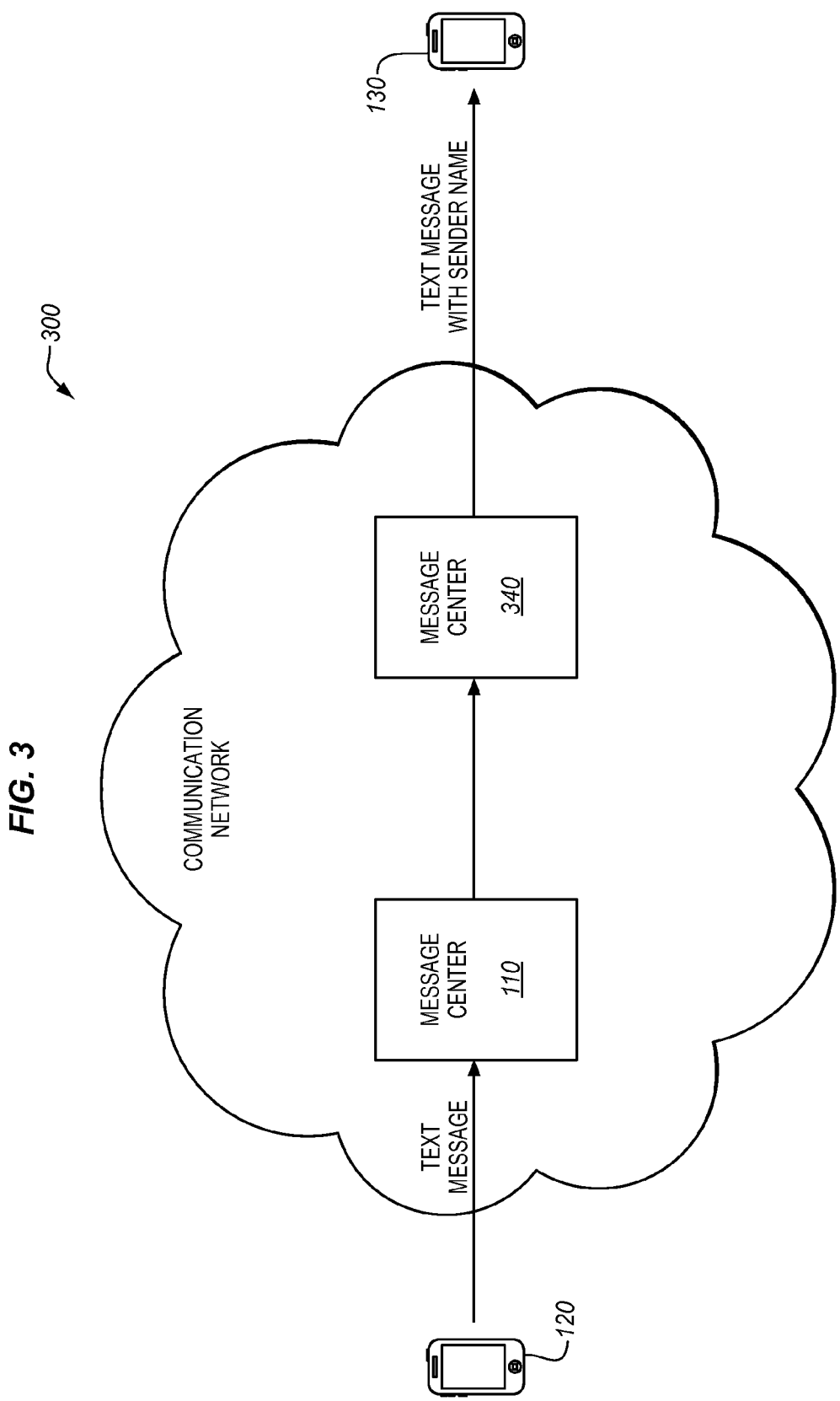
FIG. 3 illustrates another communication network in an exemplary embodiment.

When message center 110 sends the text message toward the terminating side of the network, there may be a different message center that serves the recipient. This scenario is illustrated in FIG. 3. FIG. 3 illustrates another communication network 300 in an exemplary embodiment. Network 300 includes another message center 340 that serves device 130. Message center 340 may include similar components as message center 110 (see FIG. 1), which are not shown for the sake of brevity. When message center 110 transmits the text message toward the recipient, the text message is routed to message center 340. Message center 340 may then operate as described further in FIG. 4.

Figure 4:
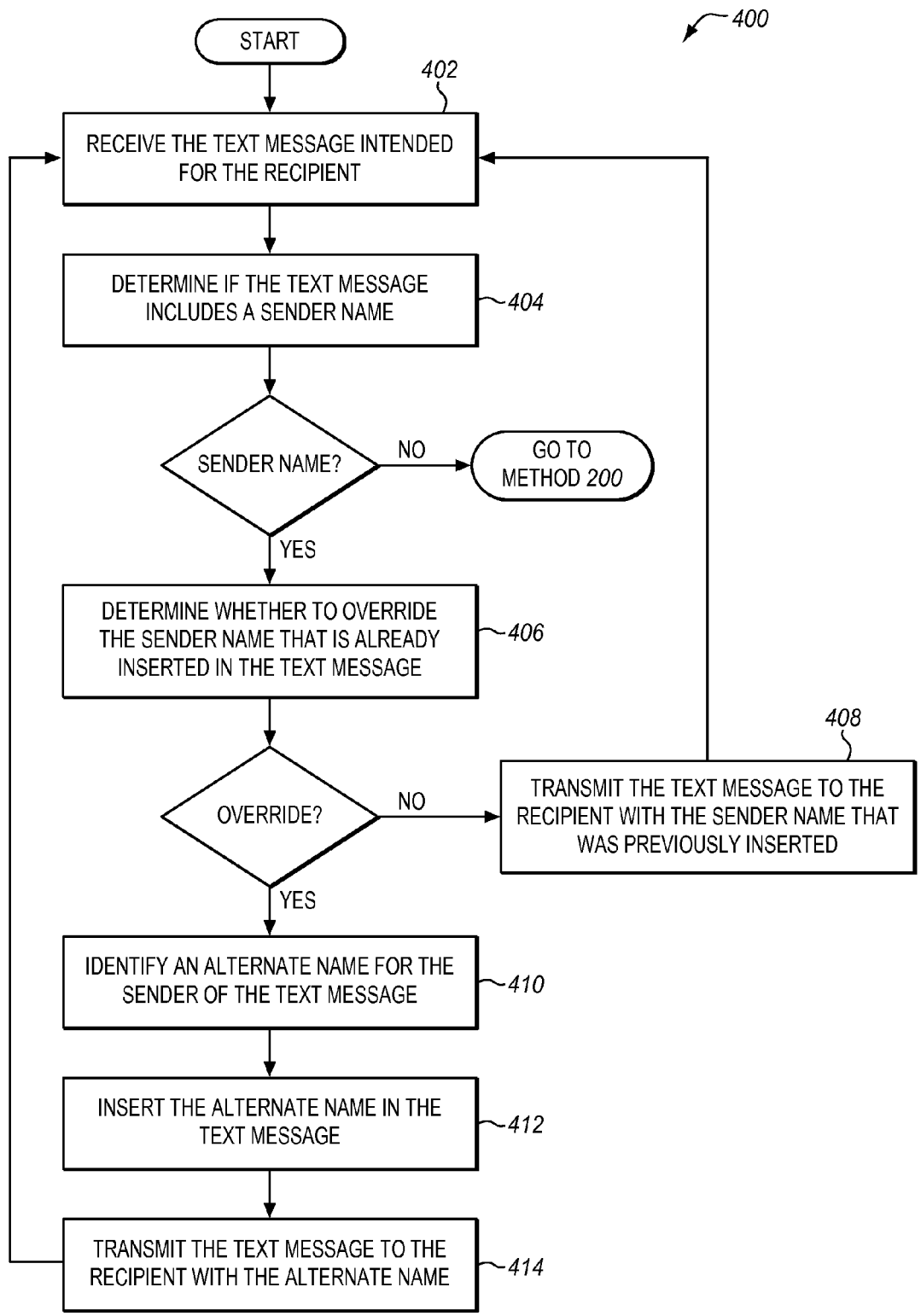
FIG. 4 is a flow chart illustrating a method of handling a text message in a message center that serves a recipient in an exemplary embodiment.

FIG. 4 is a flow chart illustrating a method 400 of handling a text message in a message center that serves a recipient in an exemplary embodiment. The steps of method 400 will be described with reference to message center 340 in FIG. 3, but those skilled in the art will appreciate that methods described herein may be performed in other systems.

In step 402, message center 340 receives the text message intended for the recipient. Because this text message is being terminated in device 130 that is served by message center 340, the text message at this point may be considered a Mobile Terminated (MT) text message. If the text message were being terminated in an automated system, the text message would be considered an Application Terminated (AT) text message. In step 404, message center 340 determines if the text message includes a sender name. If the text message does not include a sender name, then message center 340 may operate as described in FIG. 2 to insert a sender name in the text message.

If the text message includes a sender name, then message center 340 determines whether to override the sender name that is already inserted in the text message in step 406. Message center 340 may process policy rules defined by the recipient or the network operator to determine whether to override the sender name. If the determination is not to override, then message center 340 transmits the text message to the recipient with the sender name that was previously inserted (step 408). If the determination is to override, then message center 340 identifies an alternate name for the sender of the text message in step 410. Message center 340 then inserts the alternate name in the text message (step 412), and transmits the text message to the recipient with the alternate name (in step 414).

Figure 5:
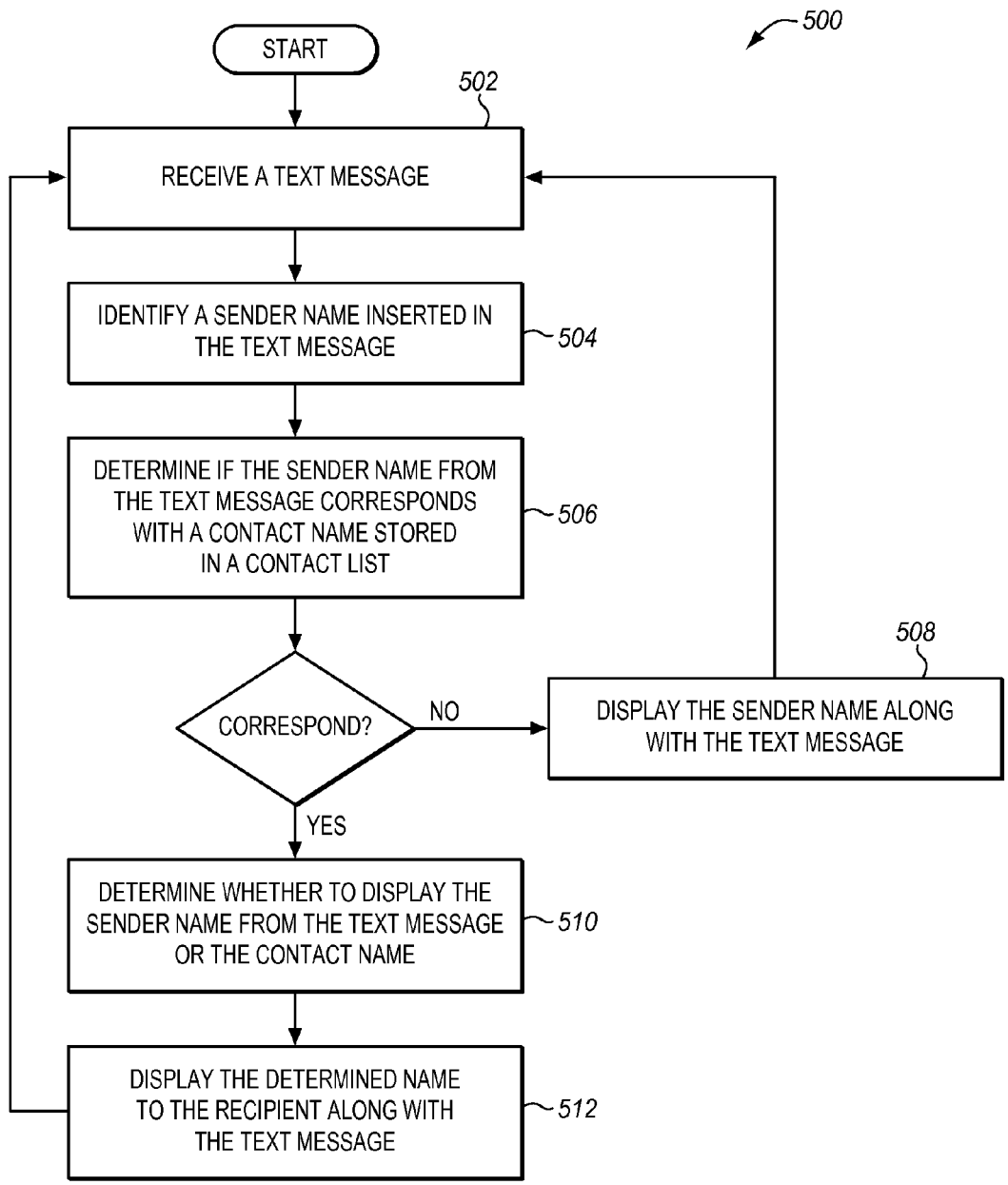
FIG. 5 is a flow chart illustrating a method of handling a text message that includes caller ID information in an end user device in an exemplary embodiment.

Eventually the text message will be delivered to device 130 of the recipient, either by message center 110, message center 340, or another network element. Device 130 may then operate as described further in FIG. 5. FIG. 5 is a flow chart illustrating a method 500 of handling a text message that includes caller ID information in an end user device in an exemplary embodiment. The steps of method 500 will be described with reference to end user device 130 in FIGS. 1 and 3, but those skilled in the art will appreciate that methods described herein may be performed in other systems.

In step 502, device 130 receives the text message. In step 504, device 130 identifies the sender name inserted in the text message. For example, device 130 may parse the header of the text message to identify the parameter that includes the sender name, and then extract the sender name from this parameter. In step 506, device 130 determines whether the sender name from the text message corresponds with a contact name stored in a contact list (or phonebook) on device 130. Most mobile devices provide a function where an end user is able to store a contact list. A typical contact list includes a name for a contact, which may be a full given name (first, middle, last) or nickname. The contact list also includes one or more directory numbers, an email address, a physical address, etc. Thus, device 130 compares the sender name from the text message to the contact list stored locally.

Figure 6:
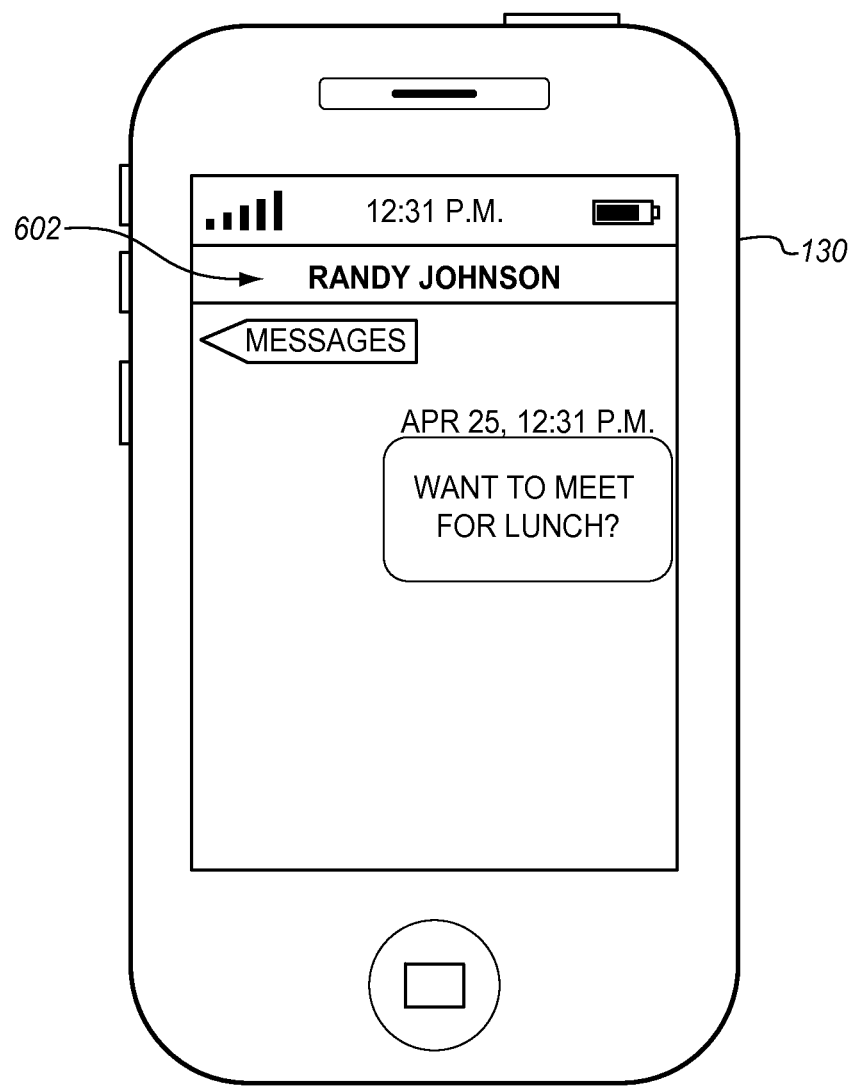
FIG. 6 illustrates a device displaying a name along with a text message in an exemplary embodiment.

If the sender name from the text message does not correspond with a contact name from the contact list, then device 130 displays the sender name along with the text message in step 508. If the sender name from the text message corresponds with a contact name from the contact list, then device 130 determines whether to display the sender name from the text message or the contact name in step 510. Device 130 may process policy rules defined by the recipient to determine which name to display. For example, the policy rules may define that the sender name inserted from the text message takes precedence over a contact name from the contact list. Device 130 then displays the determined name along with the text message in step 512. FIG. 6 illustrates device 130 displaying a name along with the text message in an exemplary embodiment. When device 130 displays the text message to the recipient, the sender name 602 is also displayed to the recipient, which is "Randy Johnson" in this example.

In addition to displaying a name of the sender in steps 508 and 512, device 130 may provide an audible alert or notification when the text message is received indicating the name of the sender.

The above embodiments advantageously provide a caller ID-type of service for text messaging. By inserting a sender name in a text message, the recipient is able to see who a text message is from. Even if the sender is not part of the contact list of the recipient's phone, the recipient is still able to see the name of the person who sent the text message.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
   a Short Message Service Center (SMSC) configured to receive a text message from a message center over a network, and to determine whether the text message includes a sender name of a person who sent the text message;
   when the text message does not include the sender name, the SMSC is configured to parse the text message to locate a directory number of the sender, to send a query to a Home Subscriber Server (HSS) to acquire a name of the sender that is defined within the network as associated with the directory number, and to insert the sender name in the text message;
   when the text message includes the sender name, the SMSC is configured to process policy rules defined by a recipient to determine whether to override the sender name, to identify an alternate name for the sender of the text message responsive to a determination to override, and to insert the alternate name in the text message;
   the SMSC is configured to transmit the text message towards the recipient.

2. The system of claim 1 wherein:
   the SMSC is further configured to insert the sender name in a header defined in a signaling protocol used for transporting the text message.

3. The system of claim 1 wherein:
   the SMSC is further configured to insert the sender name in a payload of the text message.

4. The system of claim 2 wherein:
   the signaling protocol comprises MAP; and
   the SMSC is further configured to insert the sender name in a MAP TP-Originating-Address parameter.

5. The system of claim 1 wherein:
   the SMSC is further configured to process the policy rules to determine whether to insert the sender name in the text message.

6. The system of claim 5 wherein:
   the SMSC is further configured to process an identity of the recipient to determine whether to insert the sender name in the text message.

7. The system of claim 1 wherein:
   the SMSC is further configured to identify a plurality of names defined for the sender, and to select one of the names based on the policy rules.

8. A method comprising:
   receiving a text message from a message center into a Short Message Service Center (SMSC);
   determining, at the SMSC, whether the text message includes a sender name of a person who sent the text message;
   when the text message does not include the sender name:
      parsing the text message in the SMSC to locate a directory number of the sender;
      sending a query from the SMSC to a Home Subscriber Server (HSS) to acquire a name of the sender that is defined within the network as associated with the directory number; and
      inserting the sender name in the text message;
   when the text message includes the sender name:
      determining, at the SMSC, whether to override the sender name by processing policy rules defined by a recipient;
      identifying an alternate name for the sender of the text message responsive to a determination to override; and
      inserting the alternate name in the text message; and
   transmitting the text message towards the recipient.

9. The method of claim 8 wherein inserting the sender name in the text message comprises:
   inserting the sender name in a header defined in a signaling protocol used for transporting the text message.

10. The method of claim 8 wherein inserting the sender name in the text message comprises:
    inserting the sender name in a payload of the text message.

11. The method of claim 9 wherein:
    the signaling protocol comprises MAP; and
    inserting the sender name in the header of the text message comprises inserting the sender name in a MAP TP-Originating-Address parameter.

12. The method of claim 8 further comprising:
    processing the policy rules to determine whether to insert the sender name in the text message.

13. The method of claim 12 further comprising:
    processing an identity of the recipient to determine whether to insert the sender name in the text message.

14. The method of claim 8 further comprising:
    identifying a plurality of names defined for the sender; and
    selecting one of the names based on the policy rules.

* * * * *